United States Patent
Bianco et al.

(10) Patent No.: US 11,379,359 B2
(45) Date of Patent: Jul. 5, 2022

(54) SELECTING DATA TRANSFER UNITS ASSOCIATED WITH A DATA STREAM FOR GARBAGE COLLECTION

(71) Applicant: Micron Technology, Inc., Boise, ID (US)

(72) Inventors: Antonio David Bianco, Boise, ID (US); Steven S. Williams, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/788,196

(22) Filed: Feb. 11, 2020

(65) Prior Publication Data

US 2021/0248067 A1     Aug. 12, 2021

(51) Int. Cl.
*G06F 12/02*     (2006.01)
(52) U.S. Cl.
CPC .. *G06F 12/0253* (2013.01); *G06F 2212/1044* (2013.01)
(58) Field of Classification Search
None
See application file for complete search history.

(56) References Cited

U.S. PATENT DOCUMENTS

| | | | |
|---|---|---|---|
| 7,392,340 B1* | 6/2008 | Dang | G06F 12/0871 711/111 |
| 10,739,996 B1* | 8/2020 | Ebsen | G06F 3/064 |
| 2013/0159626 A1* | 6/2013 | Katz | G06F 3/0608 711/119 |
| 2017/0031604 A1* | 2/2017 | Lotem | G06F 3/0688 |
| 2018/0276118 A1* | 9/2018 | Yanagida | G06F 3/0688 |
| 2018/0293003 A1* | 10/2018 | Muchherla | G06F 3/0679 |
| 2018/0307596 A1* | 10/2018 | Pandurangan | G06F 12/0246 |

* cited by examiner

*Primary Examiner* — Jared I Rutz
*Assistant Examiner* — Marwan Ayash
(74) *Attorney, Agent, or Firm* — Holland & Hart LLP

(57) ABSTRACT

Methods, systems, and devices for data stream processing for media management are described. A set of transfer units of a plurality of transfer units associated with a cursor of a garbage collection procedure are selected. The selecting is based on a set of data streams corresponding to the cursor and each transfer unit of the set of transfer units is associated with a same data stream of the set of data streams. A plurality of write commands are issued in connection with the garbage collection procedure for the cursor. Each write command includes an instruction to write a transfer unit of the set of transfer units to a respective destination address of the memory sub-system.

20 Claims, 5 Drawing Sheets

SELECTING DATA TRANSFER UNITS ASSOCIATED WITH A DATA STREAM FOR GARBAGE COLLECTION

TECHNICAL FIELD

The following relates generally to a memory sub-system and more specifically to data stream processing for a media management procedure for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Figure 1:
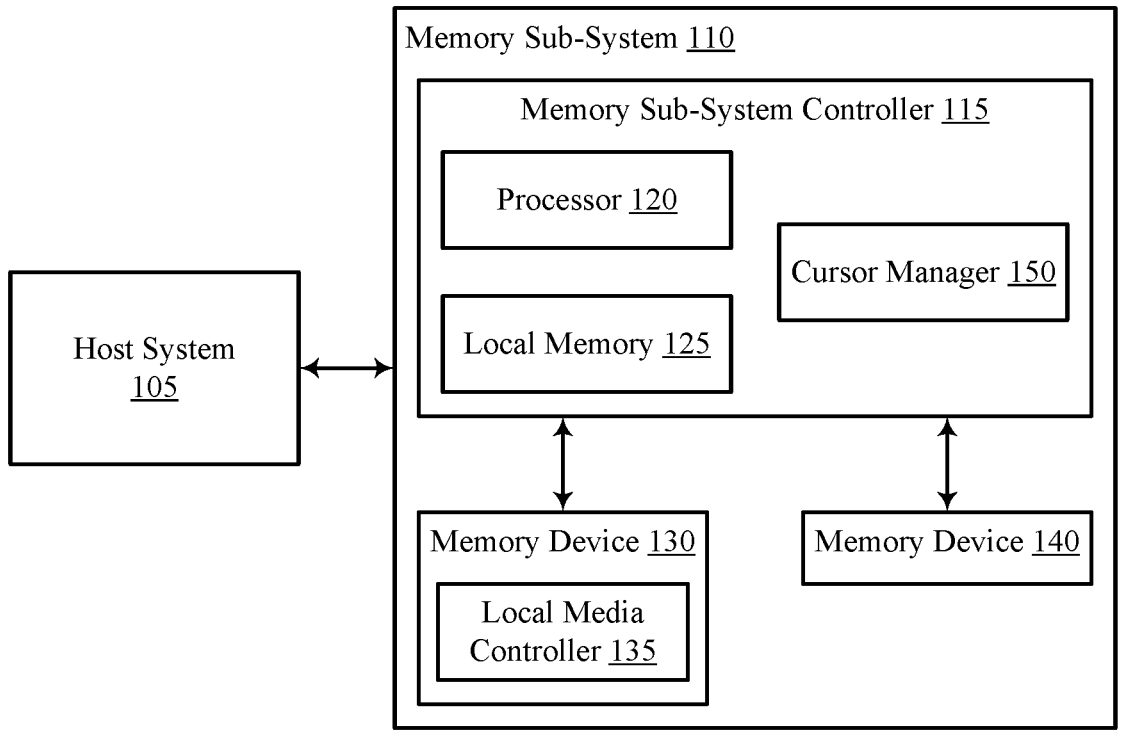
FIG. 1 illustrates an example computing system that includes a memory sub-system in accordance with some examples of the present disclosure.

Aspects of the present disclosure are directed to data stream processing for media management for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory sub-system controller and the corresponding page (e.g., the page on which the valid data is contained) is erased. The valid data can then be written (e.g., re-written) to the memory sub-system (e.g., to a different page of the memory sub-system). In order to write the valid data to a location (e.g., a different page of the memory sub-system), write commands are issued by the memory sub-system controller, each write command indicating a memory address (e.g., a destination memory address) to which the valid data is to be written.

During a conventional garbage collection procedure, a block of data that includes data from a single or multiple data streams is selected for garbage collection according to a block picking algorithm. A data stream (or stream) can refer to a grouping of logical data (e.g., user data) based on one or more criteria specified by a host system. Data stream usage (e.g., by applications) tends to be such that the data written has a similar life cycle. That is, all of the data assigned to a particular stream tends to be updated, deleted, or rewritten at a similar cadence. The block picking algorithm can depend on several factors including wear leveling, error handling, or the amount of valid data in the block of data, among others. The reliance of the block picking algorithm on these and other factors can, in some cases, result in data from multiple data streams compacted together at a destination location after garbage collection is performed. The mixing of the multiple data streams (i.e., the storing or compaction of multiple data streams at a destination location) can result in data being invalidated due to host activity (e.g., due to host write operations). Accordingly, it can be beneficial to group data according to a respective data stream, which may reduce an amount of garbage collection procedures performed on the data, and can increase performance and endurance of the memory sub-system.

Aspects of the present disclosure address the above and other deficiencies by assigning a unique identifier to data written to each block of a memory sub-system. For example, data can be written to a given block of the memory sub-system from a primary data source and associated with a single data stream. Although some mixing of data streams can occur initially or at this stage (e.g., due to data being written to the block from other data sources), a majority of the data can be written from a single data source, associated with a single data stream, and identified by the unique identifier.

In some examples, a block of data can include data from various data sources (i.e., a mixing of data can occur). Data stored to the block from the various data sources may each be associated with a unique identifier representative of the data stream from which the data was written. For example, a single block of data can include data written from three different data streams, and data written from each of the three streams can be associated with a different, unique identifier. In some examples, the block can be associated with its own unique identifier, which can be (or can be associated with) the identifier of the data stream having the greatest number of writes issued for the block.

When a garbage collection procedure is performed, a cursor (e.g., a single cursor) can be loaded with a block of data. A cursor can refer to an entity (e.g., a firmware entity) that can control the write order of data to a block. As discussed herein, the data loaded to a cursor for a garbage collection procedure can be selected based on the unique identifiers associated with the data streams written to the blocks of the memory sub-system. That is, a garbage collection procedure can be performed on one or more blocks based on the respective block's unique identifier. Because the unique identifier of a block can be based the data stream having the greatest number of writes issued for the block, a garbage collection procedure may be performed on blocks having generally homogeneous data (e.g., data written from a same data stream). Accordingly, because the identifier of a block can be determined based on the data stream having the greatest number of write issued for that block, subsequent garbage collection procedures can occur on blocks having the same identifier such that after garbage collection, more data from the same data stream is stored together at the destination location. Such techniques can reduce an amount of garbage collection procedures performed on the data, and can increase performance and endurance of the memory sub-system.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can include a host system 105 that is coupled with one or more memory systems 110. In some examples, the host system 105 is coupled with different types of memory systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as ROM, phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), digital signal processor (DSP)), or another suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection procedures, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a cursor manager 150 that can facilitate one or more media management operations (e.g., a garbage collection) using an associated host cursor (AHC). For example, the cursor manager 150 can select a particular block of data on which to perform a garbage collection procedure based on a primary AHC associated with the block. The primary AHC can indicate (e.g., to the system) the likely source of the data of the block (e.g., the AHC can be an identifier associated with a data stream stored on the block such as the data stream having the most amount of written data to the block). The cursor manager 150 can issue multiple write commands associated with each transfer unit (TU) of the block, and can transmit an AHC associated with each TU. As the cursor manager 150 transmits each AHC, a counter corresponding to the AHC can be incremented. After the garbage collection procedure is completed, the counters can be compared, and the counter having the highest value can indicate whether the primary AHC will remain the same or be updated. Ensuring that the AHC associated with any one block is reflective of the data stream having the most amount of data on the block can minimize an amount of data stored to the block from another source (e.g., mixed data) and increase the likelihood of snap reads and other fast read operations to be performed of the memory sub-system 110. Further details with regards to the operations of the cursor manager 150 are described below.

In some examples, the memory sub-system controller 115 includes at least a portion of the cursor manager 150. For example, the memory sub-system controller 115 can include a processor 120 (e.g., a processing device) configured to execute instructions stored in local memory 125 for performing the operations described herein. In some examples, the cursor manager 150 is part of the host system 105, an application, or an operating system.

Figure 2:
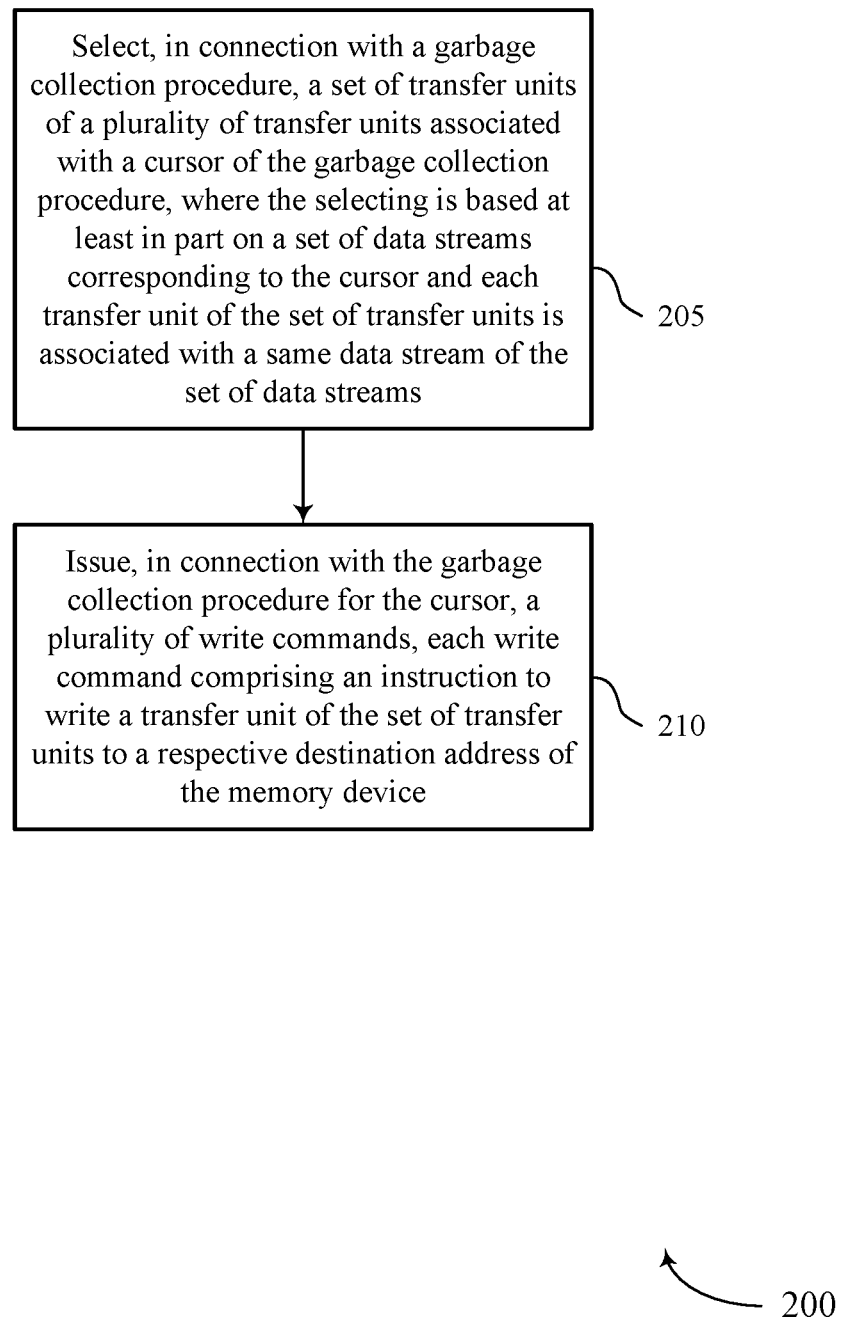
FIG. 2 is a flow diagram of an example method to perform a data stream processing for media management in accordance with some examples of the present disclosure.

FIG. 2 is a flow diagram of an example method 200 for data stream processing for media management in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the cursor manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other method flows are possible.

At operation 205, the processing device can select, in connection with a garbage collection procedure, a set of TUs associated with a cursor of the garbage collection procedure. In some examples, the selecting is based at least in part on a set of data streams corresponding to the cursor and each TU of the set of TUs is associated with a same data stream of the set of data streams.

In some examples, the method 200 can include selecting the set of TUs for performing the garbage collection procedure based at least in part on an amount of valid data of the set of data and an error handling factor. In some examples, the method 200 can include dynamically adjusting the weighting factor based at least in part on a number of the set of TUs selected for performing the garbage collection procedure.

In some examples, the method 200 can include identifying the set of data streams corresponding to the cursor based at least in part on a cursor identifier, wherein each of the set of data streams is associated with a respective host cursor. In some examples, the method 200 can include selecting a second set of TUs for performing the garbage collection procedure associated with the cursor of the garbage collection procedure, wherein each TU of the second set of TUs is associated with a same second data stream of the set of data streams different from the same data stream and issuing a second set write commands in connection with the garbage collection procedure for the cursor, each write command comprising an instruction to write one of the second set of TUs to a respective destination address of the memory sub-system.

In some examples, the method 200 can include maintaining a record indicating a respective counter for each host cursor of the cursor of the garbage collection procedure based at least in part on issuing the multiple write commands and the second set of write commands. In some examples, the method 200 can include selecting the set of TUs for performing the garbage collection procedure on a set of data based at least in part on a weighting factor for data streams associated with a same host cursor as the set of data.

At operation 210, the processing device can issue, in connection with the garbage collection procedure for the cursor, multiple write commands. In some examples, each write command can include an instruction to write a TU of the set of TUs to a respective destination address of the memory sub-system.

In some examples, the method 200 can include sending an indication of a respective host cursor for each data stream of the garbage collection procedure associated with the cursor, wherein the indication is sent with the multiple write commands or the second set of write commands. In some examples, the method 200 can include storing a host cursor identifier for a set of data of the garbage collection procedure based at least in part on the record, wherein the host cursor identifier corresponds to a host cursor in the record having a highest count value.

Figure 3:
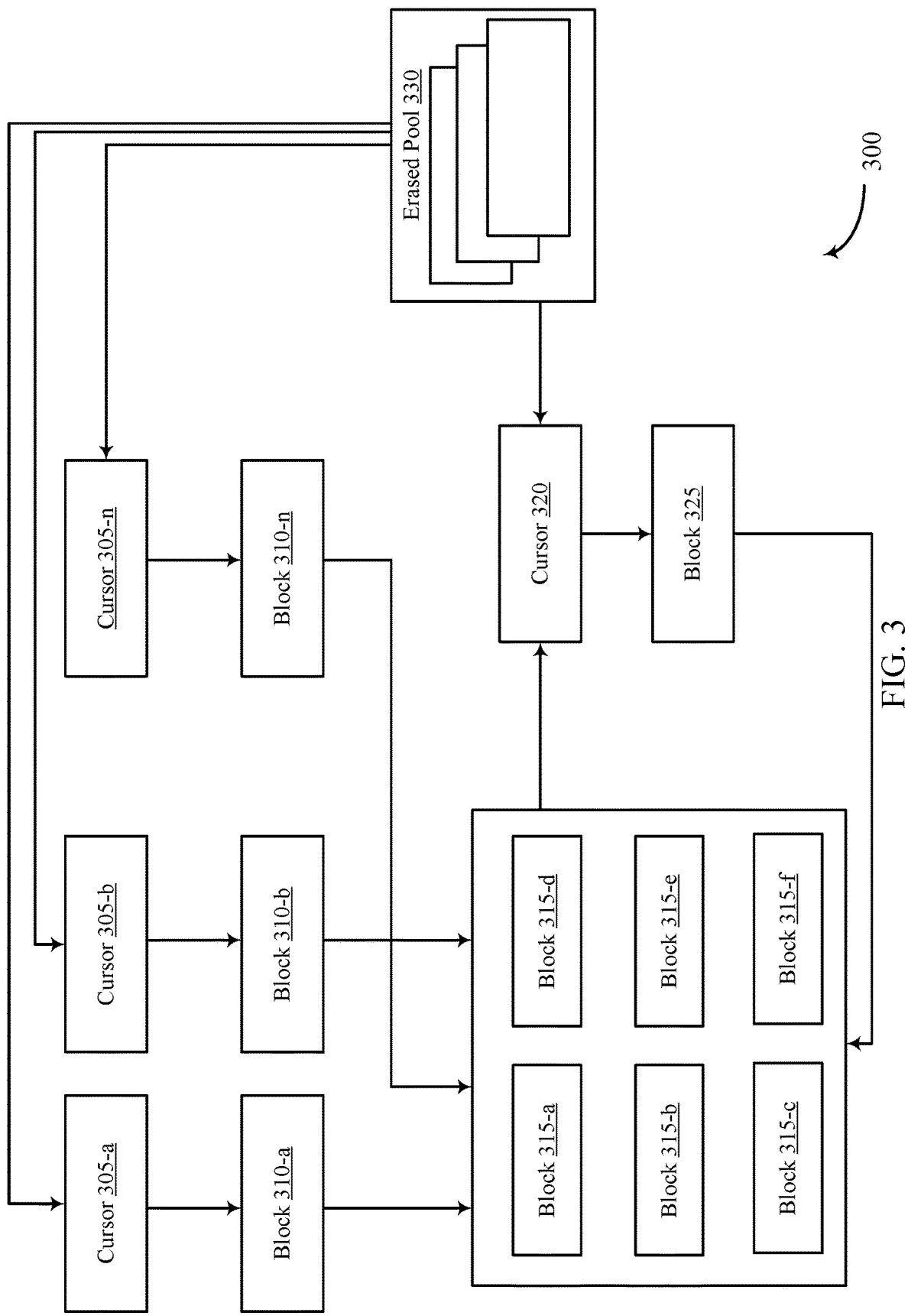
FIG. 3 is a method flow diagram of an example method to perform a data stream processing for media management in accordance with some examples of the present disclosure.

FIG. 3 illustrates an example of a method flow diagram 300 for data stream processing for media management in accordance with some examples of the present disclosure. The method flow diagram 300 can illustrate stages for performing a garbage collection procedure. The method flow diagram 300 illustrates multiple cursors (e.g., cursors 305-a, 305-b, and 305-n) for controlling to which blocks data is written. The method flow diagram 300 also illustrates multiple blocks for data to be written (e.g., block 310-a, block 210-b, block 310-n) and multiple blocks that include data (e.g., blocks 315-a through 315-e). Additionally or alternatively, the method flow diagram 300 illustrates a pool of erased blocks 330 and a particular cursor (e.g., cursor 320) and block 325 chosen for a garbage collection procedure. In some examples, the steps or operations performed as described with reference to FIG. 3 can be implemented at a memory sub-system (e.g., a NAND memory sub-system) and can be performed according to the operations of a host system and/or local memory controller.

The method flow diagram 300 illustrates operations of a garbage collection procedure. During a garbage collection procedure, data can be migrated (e.g., internally within a memory sub-system) from one location (e.g., a source location) to another location (e.g., a destination location) independent of any direct host interaction. Garbage collection can be performed to pack valid data together, to free space for new writes, for error avoidance, for wear leveling, and/or to restore redundant array of independent nodes (RAIN) parity protection in the event of an error. Additionally or alternatively, garbage collection can consist of moving or copying data from one or more blocks (e.g., one or more blocks of NAND cells) into a destination block. In some examples, garbage collection can result in data consolidation to free resources (e.g., NAND cells) for subsequent erase and new write processing.

In some examples, the block of data transferred during a garbage collection procedure can be or can be referred to as a TU. A TU can be managed by a host system (e.g., host system 105 of FIG. 1) and can include a logical address (e.g., a TU address (TUA)) and a physical address (e.g., an abstracted physical address such as a flash logical address (FLA)). In order to consolidate data and/or free resources for subsequent access operations, the TU can be written to a new block, and the prior block (e.g., the block from which the TU is moved) can be erased. Candidates (e.g., a blocks) for garbage collection can be selected using the cursor 320 as shown in FIG. 3. In some examples, each candidate for garbage collection can include an AHC. An AHC can identify the write cursor that originally wrote the data contained within the particular block. As discussed herein, selecting a block for garbage collection based on an associated AHC can minimize an amount of unrelated (e.g., mixed) data (data associated with a different AHC) that is written to a block during the garbage collection procedure.

Each of the cursors 305-*a* through 305-*n* represent a data stream to be written to a particular block. For example, cursor 305-*a* represents a data stream to be written to block 310-*a*, cursor 305-*b* represents a data stream to be written to block 310-*b*, and cursor 305-*n* represents an nth data stream to be written to block 310-*n* (e.g., an nth block). Once data is written to a respective block, the block can be classified as a filled block. For example, each of blocks 315-*a* through 315-*f* can be filled blocks. That is, blocks 310-*a* through 310-*n* and blocks 315-*a* through 315-*f* can represent a same structure, only that blocks 310-*a* through 310-*n* have not yet been written to (e.g., have not yet been fully written to). Accordingly, because blocks 315-*a* through 315-*f* are filled blocks, these blocks can be eligible for a garbage collection procedure.

To perform a garbage collection procedure on one or more of blocks 315, the cursor 320 can select a particular block for a garbage collection procedure. In some examples, the particular block can be selected using an algorithm, whereas in other examples the block can be selected based on one or more characteristics. For example, the particular block can be selected based on an amount of valid data stored to the block, an error handling feature associated with the block, a weighted factor associated with the block, the particular AHC associated with the block, and the like. Once selected, the data can be moved to block 325 and the data from the selected block can be erased (e.g., and subsequently re-written). In some examples, block 325 can be chosen from an erased pool 330 that includes one or more empty blocks. Additionally or alternatively, each of blocks 310-*a* through 310-*n* can also be chosen from the erased pool 330.

As discussed herein, it can be beneficial to select blocks containing data written by a same cursor for garbage collection. Data associated with each of cursors 305-*a* through 305-*n* can be associated with a unique AHC. During a garbage collection procedure, the AHC associated with the block can be determined dynamically. In some examples, the AHC can be determined because there are fewer garbage collection cursors available than host cursors. That is, each unique AHC can be transmitted with a write command, which can allow for each write command to be counted (e.g., based on a counter being incremented). Accordingly, during a garbage collection procedure for a particular block (e.g., block 325), the system can be able to determine how much mixing of data occurred on the given block.

When data is written to one of blocks 310-*a* through 310-*n*, the corresponding block is assigned an AHC. For example, block 315-*a* can be selected for a garbage collection procedure and can be associated with AHC1. In some examples, AHC1 can correspond to cursor 305-*a* (i.e., indicating that data was written to block 315-*a* using cursor 305-*a*). Accordingly, when it is desirable to perform a garbage collection procedure on data associated with AHC1, block 315-*a* can be selected (e.g., by the cursor 320). Selecting block 315-*a* in this manner can reduce the amount of mixed data (e.g., data not associated with cursor 305-*a*) written to block 325 during the garbage collection procedure.

In order to minimize the amount of mixed data during a garbage collection procedure, when each write command is issued for a cursor, an AHC corresponding to the cursor can also be issued or included in the write command. The AHC can be included with the write command based on one or more internal operations (e.g., internal to the memory sub-system). At the host interface, a stream identifier can be sent with the write command. Whenever a new stream identifier is seen for the first time (e.g., by the memory sub-system), the particular stream is "opened." That is, the stream identifier replaces an empty slot or least recently used slot in a stream-to-host-cursor mapping table. If the stream identifier sent with the command is not new, then it is used to look up the associated host cursor in the stream-to-host cursor mapping table. Thus the AHC associated with the stream ID can replace the stream identifier in the internal command(s) that make up, in part or in whole, the host write command. This AHC can be used to route the internal write commands to the correct host write cursor.

Accordingly, after each AHC is assigned to a block, a corresponding counter can be incremented. Once each write command associated with the block is transmitted, the counters can be analyzed. In some examples, it can take several thousands of write commands to complete a block and even more write commands to write a block stripe. Thus the counters can be analyzed at key points in the garbage collection flow. For example, at the completion of each block stripe. In other examples, the values of the counters can be stored upon completion of the block stripe and can be analyzed at a later time.

In some examples, because the block was previously assigned an AHC, the analysis can include comparing a value of each counter to determine wither the AHC should be maintained or updated. In some examples, the counters can be kept and incremented for the writes of the block stripe being written by the garbage collection cursor. The counts can be cleared when a new block stripe is loaded into the garbage collection cursor. In some examples, the counter associated with the AHC can include a greater value than any other counters. This can indicate that the block includes mostly data associated with the AHC. In other examples, the counter associated with the AHC can indicate a lesser value than another counter, which can result in the AHC for the block being updated to the AHC associated with the other counter.

Updating the AHC for the block can occur to reduce the amount of data streams mixed in a given block 315. For example, block 315-*a* could have initially been assigned AHC1, which can correspond to cursor 305-*a*. This can indicate to the system that the data stored to block 315-*a* is mostly written by cursor 305-*a*. Accordingly, when a garbage collection procedure associated with AHC1 is conducted, block 315-*a* can be selected by the cursor 320. Selecting the block associated with the AHC (e.g., AHC1) can be desirable because the system anticipates that the data stored to that block (e.g., block 315-*a*) is associated with a particular cursor (cursor 305-*a*). During the garbage collection procedure, however, a counter associated with an AHC other than AHC1 can be the most incremented counter. For example, a counter associated with AHC2 can be incremented the most due to more write commands for data associated with AHC2, which corresponds to a different data stream than AHC1, being issued during the garbage collection procedure. The counter AHC2 can be associated with a different cursor (e.g., cursor 305-*b*), which can indicate that a majority of the stored data is associated with the cursor 305-*b*. In such an example, the AHC of the block can be updated to AHC2. Updating the AHC can minimize an amount of mixed data during the garbage collection procedure.

Figure 4:
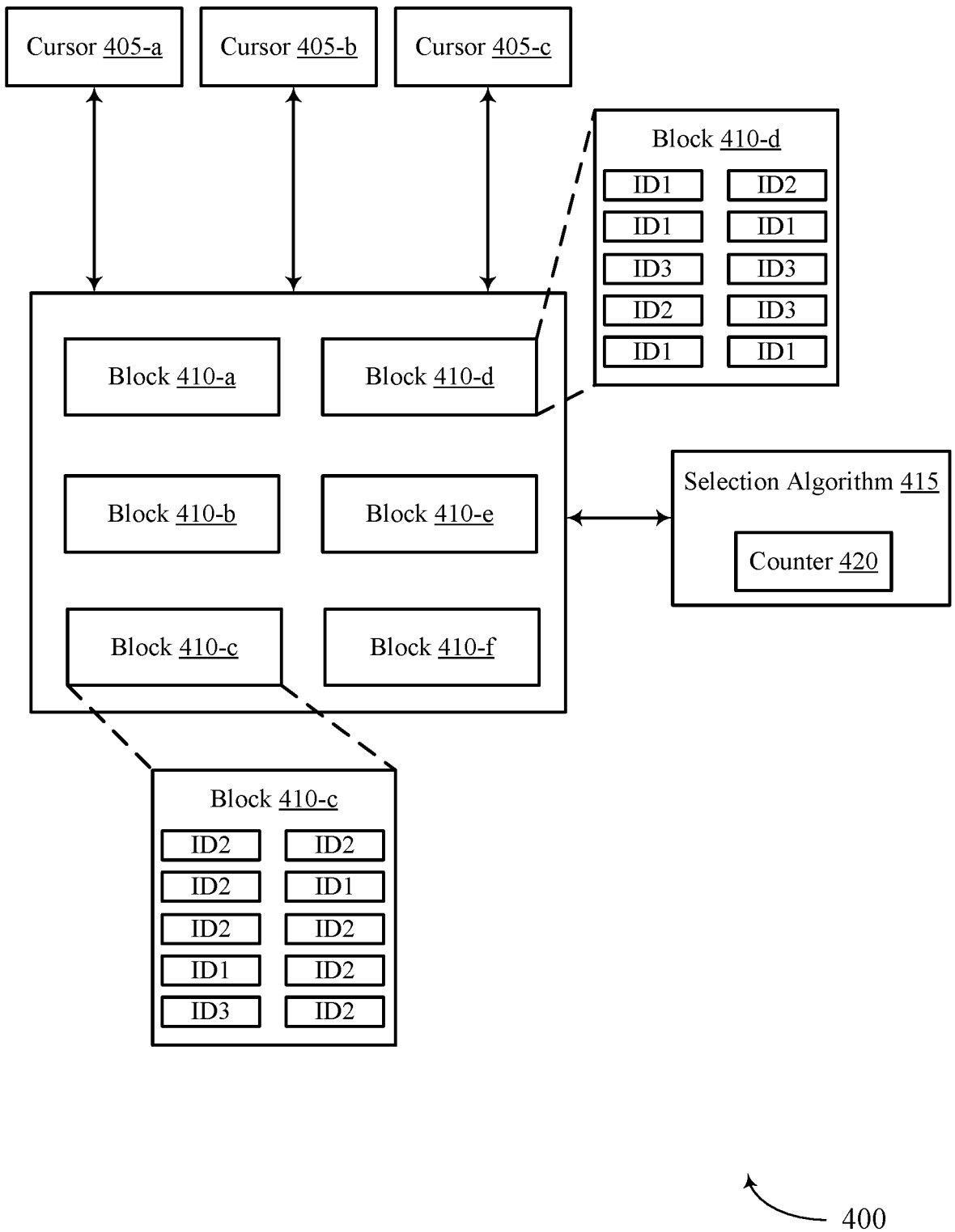
FIG. 4 is an example of a memory sub-system for performing data stream processing for media management in accordance with some examples of the present disclosure.

FIG. 4 illustrates an example of a memory sub-system 400 for performing data stream processing for media management in accordance with some examples of the present disclosure. The memory sub-system 400 can include multiple cursors (e.g., cursors 405-a, 405-b, and 405-n) for controlling to which blocks data is written, multiple blocks to which data has been written (e.g., blocks 410-a through 410-f), and a selection algorithm 415 for selecting one or more cursors and/or blocks for a garbage collection procedure. In some examples, the selection algorithm 415 can include a counter 420 for determining (e.g., counting) a number of particular AHCs associated with any one written block.

Each of the cursors 405-a, 405-b, and 405-c represent a data stream to be written to a particular block. For exemplary purposes only, cursor 405-a represents a data stream to be written to block 410-a, cursor 405-b represents a data stream to be written to block 410-c, and cursor 405-c represents an nth data stream to be written to block 410-d (e.g., an nth block). In some examples (not shown), the memory sub-system 400 can include a respective cursor for each block (e.g., blocks 410-a through 410-f). In some examples, each block can include an identifier (e.g., an AHC) that indicates which cursor originally wrote data to the block. For example, cursor 405-a can be associated with AHC1, cursor 405-b can be associated with AHC2, and cursor 405-c can be associated with AHC3.

To perform a garbage collection procedure on one or more blocks 410, the selection algorithm 415 can select a particular block 410 for a garbage collection procedure. In some examples, the particular block can be selected based a number of stream IDs associated with the block, the AHC associated with the block, and the like. For example, the selection algorithm 415 can determine to perform a garbage collection procedure on a block associated with AHC1. For exemplary purposes only, block 410-c can be associated with AHC1. The selection algorithm 415 can select block 410-c and move its data to a separate empty block so that block 410-c can be erased (e.g., and subsequently re-written). In some examples, the empty block can be chosen from an erased pool (e.g., an erased pool 330 as discussed with reference to FIG. 3).

As discussed herein, it can be beneficial to select blocks containing data written by a same cursor for garbage collection. Accordingly, each time data is written to a block (e.g., block 410-c), a counter can be incremented. That is, each stream ID can be transmitted with a write command, which can allow for each write command to be counted by the counter 420. For example, block 410-c can include data (e.g., pages) associated with ID1, ID2, and ID3. Each time a write command associated with each piece of data stored to block 410-c is transmitted, the counter 420 can determine (e.g., count) a stream ID associated with the block. That is, the counter 420 can determine that block 410-c is associated with two (2) ID1s, seven (7) ID2s, and two (2) ID3s. Because block 410-c was originally associated with AHC1, and the counter 420 identified that the majority of the block's data is associated with AHC1, the AHC of block 410-c can remain AHC1 (e.g., the selection algorithm 415 cannot update the AHC of block 410-c). Not updating the AHC associated with a block can indicate that amount of data mixed with the AHC from other AHCs during the garbage collection procedure was relatively minimal and therefore did not impact the AHC to be associated with the block.

In another example, the selection algorithm 415 can determine to perform a garbage collection procedure on a block associated with AHC2. For exemplary purposes only, block 410-d can be associated with AHC2. The selection algorithm 415 can select block 410-d and move its data to a separate empty block so that block 410-d can be erased (e.g., making it available for subsequent writes). In some examples, the empty block can be chosen from an erased pool (e.g., an erased pool 330 as discussed with reference to FIG. 3).

As discussed herein, each time a write command associated with each piece of data stored to block 410-d is transmitted, the counter 420 can be incremented. That is, the counter 420 can determine that block 410-d is associated with give (5) ID1s, two (2) ID2s, and three (3) id 3s. Because block 410-d was originally associated with AHC2, and the counter 420 identified that the majority of the block's data is associated with AHC1, the AHC of block 410-c can be updated. For example, the selection algorithm 415 can update the AHC of block 410-d to AHC1, which can be associated with a different cursor (e.g., cursor 405-a). Updating the AHC can indicate data on the block associated with a given AHC is more than the amount of data associated with other AHCs.

Figure 5:
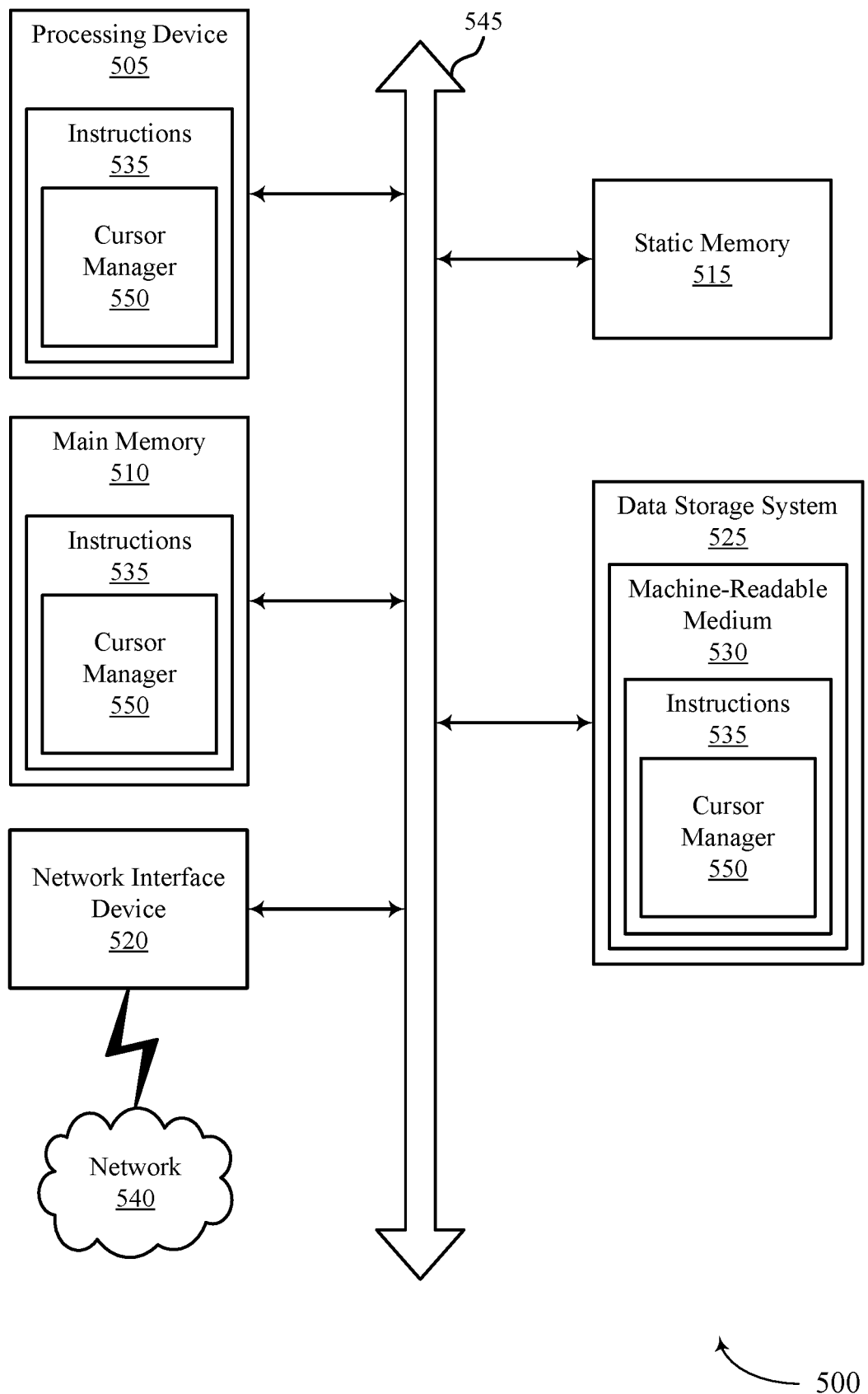
FIG. 5 is a block diagram of an example computer system in which examples of the present disclosure can operate.

FIG. 5 illustrates an example machine of a computer system 500 that supports an elastic buffer for media management in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the cursor manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a buffer manager 550 (e.g., the cursor manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
    updating, in connection with a garbage collection procedure, an associated host cursor identifier for a set of transfer units based at least in part on a value of a counter associated with a quantity of access commands received from a host device for a data stream associated with the associated host cursor identifier, wherein each transfer unit of the set of transfer units comprises one or more blocks of memory cells;
    selecting, based at least in part on updating the associated host cursor identifier for the set of transfer units and in connection with the garbage collection procedure, the set of transfer units of a plurality of transfer units associated with a cursor of the garbage collection procedure, wherein the selecting is based at least in part on a set of data streams corresponding to the cursor and each transfer unit of the set of transfer units is associated with a same data stream of the set of data streams; and
    issuing, in connection with the garbage collection procedure for the cursor, a plurality of write commands, each write command comprising an instruction to write a transfer unit of the set of transfer units to a respective destination address of a memory sub-system.

2. The method of claim 1, further comprising:
identifying the set of data streams corresponding to the cursor based at least in part on a cursor identifier, wherein each of the set of data streams is associated with a respective host cursor.

3. The method of claim 1, further comprising:
selecting a second set of transfer units for performing the garbage collection procedure associated with the cursor of the garbage collection procedure, wherein each transfer unit of the second set of transfer units is associated with a same second data stream of the set of data streams different from the same data stream; and
issuing a second plurality of write commands in connection with the garbage collection procedure for the cursor, each write command comprising an instruction to write one of the second set of transfer units to a respective destination address of the memory subsystem.

4. The method of claim 3, further comprising:
sending an indication of a respective host cursor for each data stream of the garbage collection procedure associated with the cursor, wherein the indication is sent with the plurality of write commands or the second plurality of write commands.

5. The method of claim 4, further comprising:
maintaining a record indicating a respective counter for each host cursor of the cursor of the garbage collection procedure based at least in part on issuing the plurality of write commands and the second plurality of write commands.

6. The method of claim 5, further comprising:
storing the associated host cursor identifier for a set of data of the garbage collection procedure based at least in part on the record, wherein the associated host cursor identifier corresponds to a host cursor in the record having a highest count value.

7. The method of claim 1, further comprising:
selecting the set of transfer units for performing the garbage collection procedure on a set of data based at least in part on a weighting factor for data streams associated with a same host cursor as the set of data.

8. The method of claim 7, wherein
selecting the set of transfer units for performing the garbage collection procedure based at least in part on an amount of valid data of the set of data and an error handling factor.

9. The method of claim 7, further comprising:
dynamically adjusting the weighting factor based at least in part on a number of the set of transfer units selected for performing the garbage collection procedure.

10. A system comprising:
a plurality of memory components; and
a processing device, operatively coupled with the plurality of memory components, to:
update, in connection with a garbage collection procedure, an associated host cursor identifier for a set of transfer units based at least in part on a value of a counter associated with a quantity of access commands received from a host device for a data stream associated with the associated host cursor identifier, wherein each transfer unit of the set of the transfer units comprises one or more blocks of memory cells;
select, based at least in part on updating the associated host cursor identifier for the set of transfer units, the set of transfer units of a plurality of transfer units associated with a cursor for the garbage collection procedure of the plurality of memory components, wherein each transfer unit of the set of transfer units is associated with a same data stream of a set of data streams corresponding to the cursor; and
issue a plurality of read commands in connection with the garbage collection procedure for the cursor, each read command comprising an instruction to read one of the set of transfer units at a respective source address of the plurality of memory components.

11. The system of claim 10,
the processing device is further to:
receive a set of read values for the set of transfer units in response to the plurality of read commands; and
issue, in connection with the garbage collection procedure for the cursor, a plurality of write commands, each write command comprising an instruction to write a transfer unit of the set of transfer units to a respective destination address of the plurality of memory components.

12. The system of claim 11,
the processing device is further to:
include, in each of the plurality of write commands, a respective host cursor for each data stream of the set of data streams of the garbage collection procedure associated with the cursor.

13. The system of claim 11,
the processing device is further to:
update a respective counter value for each host cursor of the garbage collection procedure associated with the cursor, each host cursor corresponding to a respective data stream of the set of data streams, wherein the respective counter value indicates a number of complete write commands of the plurality of write commands associated with a respective host cursor.

14. The system of claim 13,
the processing device is further to:
generate a record indicating the respective counter values for each host cursor of the garbage collection procedure associated with the cursor.

15. The system of claim 13,
the processing device is further to:
store a cursor identifier for a written set of data of garbage collection procedure, the cursor identifier corresponding to a host cursor having a highest counter value of the respective counter values.

16. A non-transitory computer-readable storage medium comprising instructions that, when executed by a processing device, cause the processing device to:
update, in connection with a garbage collection procedure, an associated host cursor identifier for a set of transfer units based at least in part on a value of a counter associated with a quantity of access commands received from a host device for a data stream associated with the associated host cursor identifier, wherein each transfer unit of the set of transfer units comprises one or more blocks of memory cells;
select, based at least in part on updating the associated host cursor identifier for the set of transfer units and in connection with the garbage collection procedure, the set of transfer units of a plurality of transfer units associated with a cursor of the garbage collection procedure, wherein the selecting is based at least in part on a set of data streams corresponding to the cursor and each transfer unit of the set of transfer units is associated with a same data stream of the set of data streams; and
issue, in connection with the garbage collection procedure for the cursor, a plurality of write commands, each write command comprising an instruction to write a transfer unit of the set of transfer units to a respective destination address of a memory sub-system.

17. The non-transitory computer-readable storage medium of claim 16, wherein the processing device is further to:
identify the set of data streams corresponding to the cursor based at least in part on a cursor identifier, wherein each of the set of data streams is associated with a respective host cursor.

18. The non-transitory computer-readable storage medium of claim 16, wherein the processing device is further to:
select a second set of transfer units for performing the garbage collection procedure associated with the cursor of the garbage collection procedure, wherein each transfer unit of the second set of transfer units is associated with a second data stream of the set of data streams different from the data stream; and
issue a second plurality of write commands in connection with the garbage collection procedure for the cursor, each write command comprising an instruction to write one of the second set of transfer units to a respective destination address of the memory sub-system.

19. The non-transitory computer-readable storage medium of claim 18, wherein the processing device is further to:
send an indication of a respective host cursor for each data stream of the garbage collection procedure associated with the cursor, wherein the indication is sent with the plurality of write commands or the second plurality of write commands.

20. The non-transitory computer-readable storage medium of claim 19, wherein the processing device is further to:
maintain a record indicating a respective counter for each host cursor of the cursor of the garbage collection procedure based at least in part on issuing the plurality of write commands and the second plurality of write commands.

* * * * *